US 9,164,717 B2

(12) United States Patent
Takahashi (10) Patent No.: US 9,164,717 B2
(45) Date of Patent: Oct. 20, 2015

(54) PRINTING CONTROL APPARATUS, PRINTING CONTROL METHOD, AND PRINTING CONTROL PROGRAM (75) Inventor: Tadashi Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 12/814,264

(22) Filed: Jun. 11, 2010

(65) Prior Publication Data

US 2010/0316426 A1 Dec. 16, 2010

(30) Foreign Application Priority Data

Jun. 16, 2009 (JP) ................................. 2009-143528

(51) Int. Cl.
B41J 11/44 (2006.01)
G06F 3/12 (2006.01)

(52) U.S. Cl.
CPC ............ *G06F 3/1285* (2013.01); *G06F 3/1212* (2013.01); *G06F 3/1263* (2013.01)

(58) Field of Classification Search
CPC ... G06F 3/1285; G06F 3/1212; G06F 3/1263; G06F 9/3855
USPC ........... 399/16, 43, 82, 83, 87, 391, 384, 387; 400/583, 611
See application file for complete search history.

(56) References Cited

U.S. PATENT DOCUMENTS

| 4,885,613 | A | * | 12/1989 | Kudoh | ........................... 399/23 |
| 8,117,617 | B2 | * | 2/2012 | Fernstrom et al. | ............ 718/102 |
| 2005/0036811 | A1 | * | 2/2005 | Matsuoka | ..................... 399/384 |
| 2007/0236725 | A1 | * | 10/2007 | Harmon et al. | .............. 358/1.15 |

FOREIGN PATENT DOCUMENTS

| EP | 469865 A2 * | 2/1992 |
| JP | 10-20585 | 1/1998 |
| JP | 11-224168 A | 8/1999 |
| JP | 2000-29647 | 1/2000 |
| JP | 2002-258681 A | 9/2002 |
| JP | 2004-160666 A | 6/2004 |
| JP | 2005-085022 A | 3/2005 |
| JP | 2007-094675 A | 4/2007 |
| JP | 2007-328737 A | 12/2007 |
| JP | 2008-234481 A | 10/2008 |

* cited by examiner

Primary Examiner — Matthew G Marini
(74) Attorney, Agent, or Firm — Canon U.S.A., Inc. IP Division (57) ABSTRACT A method for controlling printing control apparatus for printing an image on any of a plurality of recording media each set in a plurality of storage units includes inputting a plurality of print jobs, and determining an execution order of the plurality of print jobs in a range in which printing is consecutively executed on the recording medium fed from the same storage unit based on a type of the recording medium corresponding to each of the input plurality of print jobs, and in which each of the input print jobs is not postponed more than a predetermined condition.

13 Claims, 6 Drawing Sheets

| | | | PERMITTED LIMIT 2 (ONLY UP TO 2 JOBS CAN BE OVERTAKEN) |
|---|---|---|---|
| NOW OUTPUTTING | JOB 1 | PLAIN PAPER A0 | ROLL PAPER 1 |
| OUTPUT WAITING 1 | JOB 2 | COATED PAPER A0 | ROLL PAPER 3 |
| OUTPUT WAITING 2 | JOB 3 | PLAIN PAPER A0 | ROLL PAPER 1 |
| OUTPUT WAITING 3 | JOB 4 | COATED PAPER A0 | ROLL PAPER 3 |
| OUTPUT WAITING 4 | JOB 5 | PLAIN PAPER A0 | ROLL PAPER 1 |
| OUTPUT WAITING 5 | JOB 6 | PLAIN PAPER A0 | ROLL PAPER 1 |

→ JOB 2 IS PERMITTED TO OVERTAKE ONLY TWO JOBS
JOBS 3 AND 5 ARE MOVED UP TO REDUCE NUMBER OF SWITCHES

| NOW OUTPUTTING | JOB 1 | PLAIN PAPER A0 | ROLL PAPER 1 |
|---|---|---|---|
| OUTPUT WAITING 1 | JOB 3 | PLAIN PAPER A0 | ROLL PAPER 1 |
| OUTPUT WAITING 2 | JOB 5 | PLAIN PAPER A0 | ROLL PAPER 1 |
| OUTPUT WAITING 3 | JOB 2 | COATED PAPER A0 | ROLL PAPER 3 |
| OUTPUT WAITING 4 | JOB 4 | COATED PAPER A0 | ROLL PAPER 3 |
| OUTPUT WAITING 5 | JOB 6 | PLAIN PAPER A0 | ROLL PAPER 1 |

FIG. 6

PRINTING CONTROL APPARATUS, PRINTING CONTROL METHOD, AND PRINTING CONTROL PROGRAM

BACKGROUND OF THE INVENTION

1. Field of the Invention

The present invention relates to a printing control apparatus, and a control method and a program thereof for printing am image on a recording medium based on input data.

2. Description of the Related Art

Conventionally, a printer for printing an image on a continuous sheet of paper such as roll paper is known. In such a printer, a plurality of rolls of roll paper may be simultaneously set, and printing may be performed on any of the rolls of the roll paper by switching paper feeding level (e.g., see Japanese Patent Application Laid-Open No. 10-20585).

Such a printer can print images in various sizes by setting rolls of roll paper having different widths. Alternatively, such a printer can print images on different kinds of roll paper without replacing the roll paper. Further, also known is a configuration in which a printing order can be rearranged so that printing is consecutively performed on same-sized cut paper when printing on cut paper set in a cassette (e.g., see Japanese Patent Application Laid-Open No. 2000-29647).

However, when the printing order is rearranged so that printing is consecutively performed on the same recording medium, if the printing is to be performed many times on a specific recording medium, printing on other recording media may be endlessly postponed.

SUMMARY OF THE INVENTION

The present invention is directed to a printing control apparatus and a printing control method. Further, the present invention is directed to a printing control apparatus and a printing control method capable of efficiently executing a plurality of print jobs.

According to an aspect of the present invention, a printing control apparatus for printing an image on any of a plurality of recording media each set in a plurality of storage units includes an input unit configured to input a print job, and a determination unit configured to determine an execution order of a plurality of print jobs so that printing is consecutively executed on the recording medium fed from the same storage unit based on a type of the recording medium corresponding to each of the plurality of print jobs input by the input unit, wherein the determination unit is configured to determine an execution order in a range in which each of the print jobs input by the input unit is not postponed by more than a predetermined condition.

According to an aspect of the present invention, a method for controlling printing control apparatus for printing an image on any of a plurality of recording media each set in a plurality of storage units includes inputting a plurality of print jobs, and determining an execution order of the plurality of print jobs in a range in which printing is consecutively executed on the recording medium fed from the same storage unit based on a type of the recording medium corresponding to each of the input plurality of print jobs, and in which each of the input print jobs is not postponed more than a predetermined condition.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
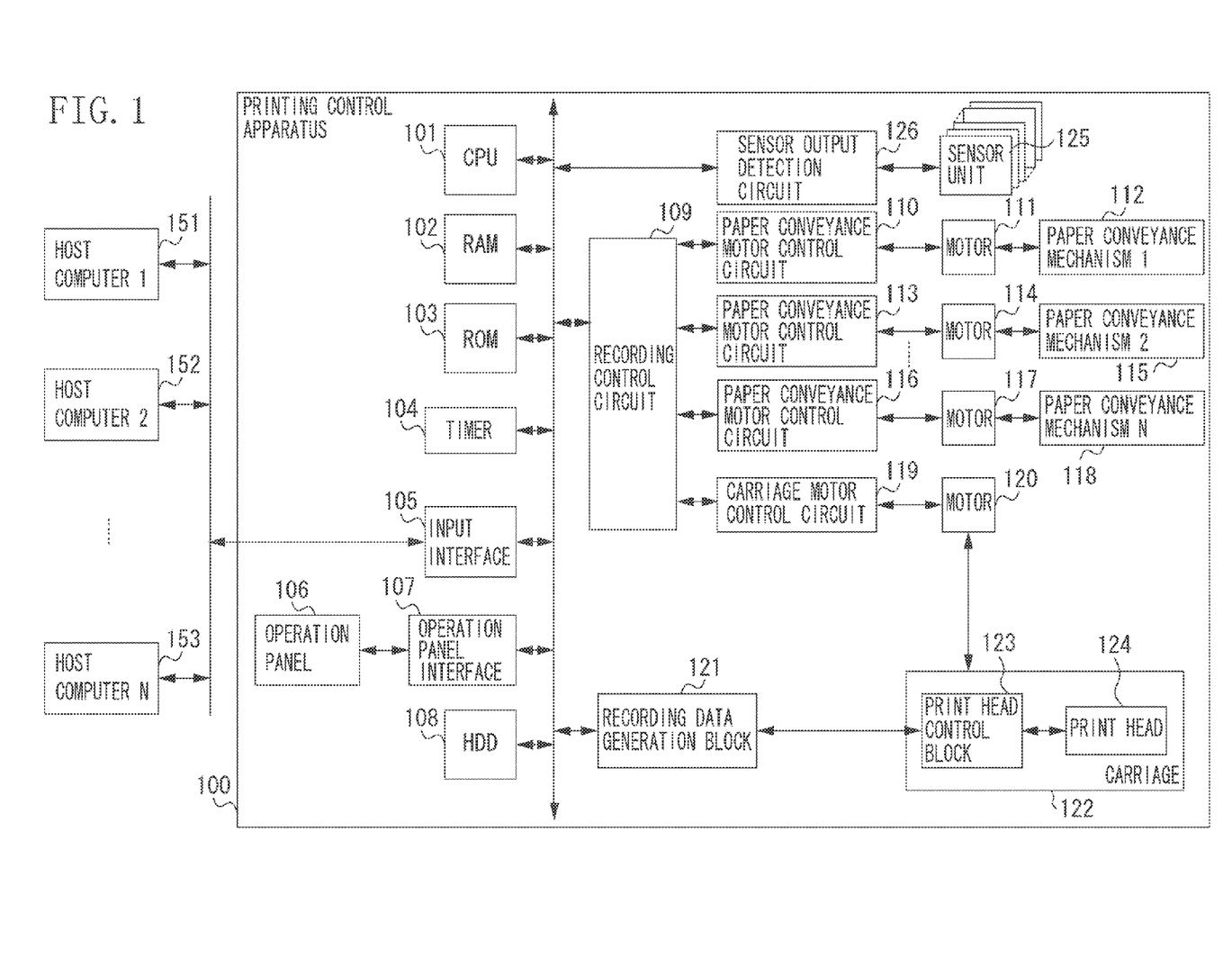
FIG. 1 is a block diagram illustrating a configuration of a printing control apparatus according to an exemplary embodiment of the present invention.

FIG. 1 is a block diagram illustrating a configuration of a printing control apparatus for printing an image on a recording medium which is an example of an exemplary embodiment according to the present invention. In the present exemplary embodiment, a printing control apparatus 100 which is configured as integration (in one housing) of a section (units 101 to 108 in FIG. 1) for controlling a print job and a printing mechanism section (units 109 to 126 in FIG. 1) for executing printing will be described as an example. However, the present exemplary embodiment is not limited to this example. The printing control apparatus may be configured so that the section controlling the print job and the printing mechanism section are separated (in separate housings). A printing control apparatus which is separated from the printing mechanism section can be realized by a print server connected with the printing mechanism section via a network, or a printer controller connected with the printing mechanism section via a local interface.

Further, in the example illustrated in FIG. 1, printing is performed based on a print job received from host computers 151, 152, and 153. However, the printing control apparatus may further include a scanner, a copy function for copying an image from the scanner, and other functions. In addition, the print job is not limited to a print job which is received from a terminal on a network. A print job received via a local interface or via some other reception method can also be used.

In the present exemplary embodiment, an example is described in which roll paper which is a continuous sheet is used as the recording medium. However, the present exemplary embodiment is not limited to a recording medium which is wound in a roll shape. Further, although the following example is described with the roll paper as the recording medium, the recording medium material is not limited to paper. Various other materials capable of being conveyed to a printing position may be used, such as cloth, a film and the like. Further, in addition to a continuous sheet, the printing control apparatus may print an image on a cut sheet set in a cassette. A plurality of cassettes in which cut sheets can be set may be provided, and the image may be printed on only the cut sheet in the respective set cassettes. Further, although an inkjet method is described as the printing method, other methods may be used, such as sublimation printing, electrophotographic printing, and the like.

As illustrated in FIG. 1, a bus connects a central processing unit (CPU) 101, a random access memory (RAM) 102, a read-only memory (ROM) 103, a timer 104, an input interface (I/F) 105, an operation panel I/F 107, a hard disk drive (HDD) 108, a recording control circuit 109, a recording data generation block 121, and a sensor output detection circuit 126.

In FIG. 1, the CPU 101 controls an overall operation of the printing control apparatus 100 by loading a program stored in the ROM 103 into the RAM 102. In addition to be used as a work area for the CPU 101, the RAM 102 stores various setting values. The timer 104 measures the time and counts how much time has elapsed from a specified time point. The input interface 105 connects the printing control apparatus 100 to a network, and receives a print job from the host computers 151 to 153 via the network.

In the present exemplary embodiment, there are three host computers are illustrated, however the number of the host computers is not limited to this. An arbitrary number of host computers may be used. Further, the input interface 105 may be a local interface.

A printer driver for causing the printing control apparatus 100 to execute printing is installed in each of the host computers 151 to 153. The host computers 151 to 153 convert data generated by various applications into print data that the printing control apparatus 100 can handle with the printer driver, and then send the print data as a print job to the printing control apparatus 100.

An operation panel 106 receives an operation from a user and displays information which needs to be provided to the user. The operation panel 106 can take various forms which include functions of, for example, receiving an operation from the user using a touch panel and a hard key, and indicating information to the user by displaying the information on a touch panel, or on a dedicated display panel, or turning on and off a lamp.

The operation panel interface 107 transmits the contents of the operation performed by the user using the operation panel 106 to the CPU 101, and transmits to the operation panel 106 the contents received from the CPU 101 which need to be displayed on the operation panel 106. The HDD 108 writes various kinds of data in a built-in hard disk, and reads various kinds of data from the hard disk.

The recording control circuit 109 controls printing of an image by controlling feeding from the roll paper set in a roll paper storage unit (hereinafter, "storage unit") and operation of a carriage 122 based on an instruction from the CPU 101. Further, the recording control circuit 109 performs timing adjustment to synchronize feeding from a selected roll from the plurality of rolls of the roll paper with scanning by the carriage 122.

A paper conveyance motor control circuit 110 controls an operation of a motor 111 for conveying the roll paper. The motor 111 conveys the roll paper to an image recording position by rotating a core around which the roll paper is wound. The motor 11 also takes up the roll paper by rotating in reverse. A paper conveyance mechanism 112 enables printing of an image on the roll paper by using a conveyance roller or the like to convey the roll paper based on an reciprocal operation of the carriage 122. Paper conveyance motor control circuits 113 and 116 are the same as the paper conveyance motor control circuit 110, motors 114 and 117 are the same as the motor 111, and paper conveyance mechanisms 115 and 118 are the same as the paper conveyance mechanism 112.

The printing control apparatus 100 includes N storage units. Each of N rolls of roll paper can be simultaneously set in each of the storage units. Printing can be executed by appropriately switching the roll paper to be used. The simultaneously set rolls of roll paper may have different sheet widths (sizes) or be different kinds of sheet. Each storage unit may be configured such that the roll paper is set in a box such as a cassette, or such that a rod-like object is simply inserted in the core of the roll paper. In either case, the storage unit configuration is not limited as long as a position for keeping the roll paper on standby is determined, and the specified roll paper can be conveyed to the printing position. Information about the size (width) and the material (sheet kind) of the roll paper set in each storage unit is stored in the RAM 102 based on an instruction from the operation panel 106. Based on the stored information, the CPU 101 determines the kind of roll paper which is set in each storage unit. The CPU 101 can control a cutter (not illustrated) to cut the roll paper on which printing is executed.

A carriage motor control circuit 119 controls an operation of a motor 120 which causes the carriage 122 to reciprocate. The motor 120 repeatedly causes the carriage 122 to reciprocate over the width of the roll paper. The carriage 122 includes a print head control block 123 and a print head 124. Based on control from the print head control block 123, the carriage 122 prints an image on the roll paper by discharging ink from the print head 124 while reciprocally moving.

A recording data generation block 121 generates data indicating ON/OFF of discharging of the ink by the print head 124 based on input image data, and supplies the generated data to the print head control block 123. Based on the supplied data, the print head control block 123 controls the print head 124 so that the image is printed.

A sensor unit 125 detects various states of the printing mechanism section using a plurality of sensors. The detection result is transmitted to the CPU 101 via a sensor output detection circuit 126.

Figure 2A:
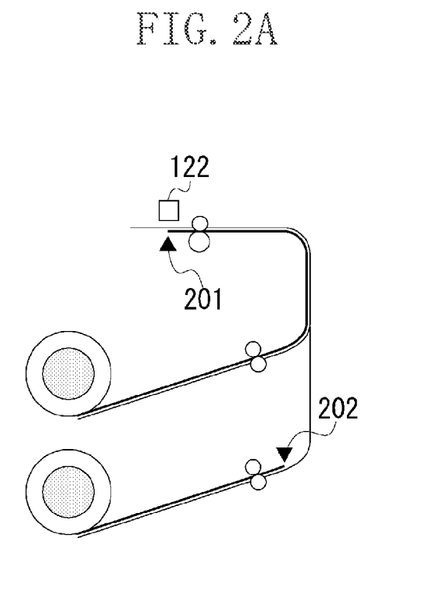
FIGS. 2A and 2B illustrate sheet switching according to the exemplary embodiment.
Figure 2B:
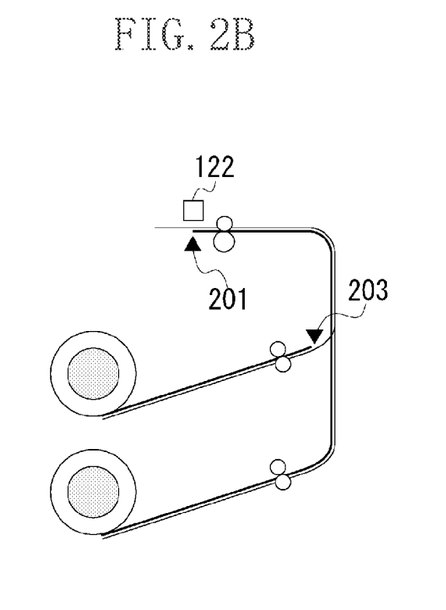

Next, switching of the roll paper for a print target in the paper conveyance mechanism (switching of the storage units for paper feeding) will be described. FIGS. 2A and 2B illustrate an overview of the paper conveyance mechanism illustrated in FIG. 1. As illustrated in FIGS. 2A and 2B, the rolls of roll paper set in the respective storage units are arranged vertically. A paper feeding target is switched by controlling a conveyance roller and the like. To simplify the description, the paper conveyance mechanisms for two rolls of roll paper are illustrated in FIGS. 2A and 2B. However, the present invention is not limited to two. Further, while not illustrated in FIGS. 2A and 2B, the paper conveyance mechanisms include a plurality of conveyance rollers for guiding the roll paper to a printing position 201 of the carriage 122. The roll paper is conveyed to the printing position 201 by rotation of the motor.

FIG. 2A illustrates a case in which the roll paper set in an upper level storage unit is selected as the roll paper for the print target. FIG. 2B illustrates a case in which the roll paper set in a lower level storage unit is selected as the roll paper for the print target.

The switching of the roll paper for the print target is performed based on an instruction from the CPU 101. When the roll paper for the print target is switched from the upper level to the lower level, first, the paper conveyance motor control circuit on the upper level rotates the motor in reverse to return the roll paper whose leading edge is conveyed to the printing position 201 to a retraction position 203. Then, when the leading edge of the roll paper on the upper level reaches the retraction position 203, the paper conveyance motor control circuit on the lower level conveys the leading edge of the roll paper on the lower level to the printing position 201. Subsequently, the carriage 122 performs scanning over the roll paper in a width direction, and repeats an operation to convey the roll paper by a predetermined length each time ink is discharged, so that an image is successively printed on the roll paper.

When the roll paper for the print target is switched from the lower level to the upper level, the opposite operation is performed. More specifically, first, the paper conveyance motor control circuit on the lower level rotates the motor in reverse to return the roll paper whose leading edge is conveyed to the printing position 201 to a retraction position 202. Then, when the leading edge of the roll paper on the lower level reaches the retraction position 202, the paper conveyance motor control circuit on the upper level conveys the leading edge of the roll paper on the upper level to the printing position 201. When three or more rolls of roll paper are simultaneously set in the respective storage units, the switching among them is performed in a similar manner.

Figure 3:
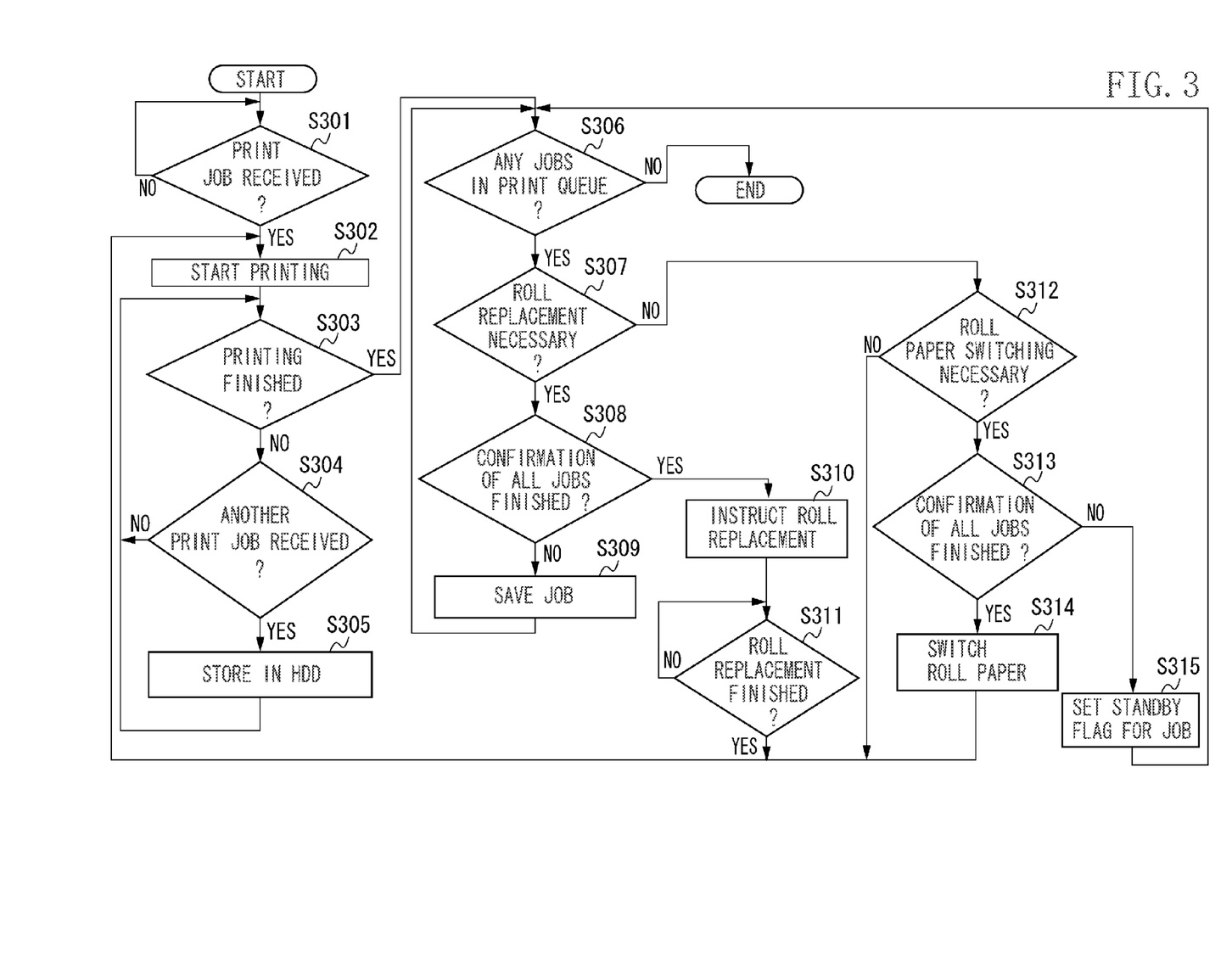
FIG. 3 is a flowchart illustrating a processing flow according to the exemplary embodiment.

Next, the processing for determining an execution order of a plurality of print jobs. FIG. 3 is a flowchart illustrating a processing flow for determining a print job execution order. The flowchart illustrates a processing flow in which the CPU 101 loads and executes a program stored in the ROM 103 into the RAM 102.

First, when a power source of the printing control apparatus 100 is turned on, in step S301, the CPU 101 waits for a print job to be sent from the host computer via the input interface 105. The term "print job" refers to a unit of data which includes print data for printing an image on a recording medium by the printing control apparatus 100.

The CPU 101 identifies a sheet size corresponding to the print job based on the input print job. The identification may be performed based on sheet size information included in the print job, or according to a size of an image generated by rasterizing the print job into the image. The sheet size includes a size in a width direction and a size in a length direction. The size in the width direction corresponds to a width of the roll paper. The size in the length direction corresponds to the length of the roll paper in the conveyance direction. In addition, the sheet size that the CPU 101 identifies is the size when the image is printed. If the sheet needs to be rotated by 90 degrees during printing of the image, the sheet size is the size after rotation.

When the print job is received in step S301 (YES in step S301), the processing proceeds to step S302. In step S302, as described above, the CPU 101 executes printing based on the print job received by controlling the recording control circuit 109 and the like. At this point, the CPU 101 analyzes the received print job, and determines a size (width) and a kind of roll paper to be used. Then, the CPU 101 selects a roll of the roll paper from among the plurality of rolls of the roll paper set in the printing control apparatus 100, and performs printing on the selected roll paper.

Then, in step S303, the CPU 101 determines whether the printing executed in step S302 is finished. If it is determined that printing is not finished (NO in step S303), the processing proceeds to step S304. If it is determined in step S304 that another print job is received before the finish of printing (YES in step S304), the processing proceeds to step S305. In step S305, the received print job is sequentially stored in the HDD 108. On the other hand, if it is determined in step S303 that printing is finished (YES in step S303), the processing proceeds to step S306.

In step S306, the CPU 101 confirms whether there are any jobs in a print queue in the HDD 108. If there are no jobs in the print queue (NO in step S306), the processing finishes. The printing control apparatus 100 then enters into a standby state, and the processing returns to step S301. If there is a job in the print queue (YES in step S306), the processing proceeds to step S307. In step S307, the CPU 101 analyzes the print job at a head of the print queue, and determines whether the roll paper to be used in the print job needs to be replaced by the user. The "print job at the head of the print queue" is the earliest received job among the jobs for which the job execution order is yet to be determined in the print queue.

The processing determines the width and the kind of the roll paper to be used in the job based on analysis of the target job to determine whether the roll paper which matches the roll paper to be used to the target job is currently set in the printing control apparatus 100. If it is determined that roll paper matching the roll paper to be used to the target job is not set, the CPU 101 determines that replacement is necessary. If it is determined that replacement of the roll paper is necessary to execute the target job (YES in step S307), the processing proceeds to step S308. If it is determined that replacement of the roll paper is not necessary (NO in step S307), specifically, if it is determined that the print job can use the currently set roll paper, the processing proceeds to step S312.

In step S308, the CPU 101 determines whether the confirmation following step S307 (determination of the job execution order) is performed for all of the jobs in the print queue stored in the HDD 108. If it is determined that there is a job which is yet to be confirmed (NO in step S308), the processing proceeds to step S309. In step S309, the print job which is the determination target in step S307 is saved. The "save" can be performed in various ways, such as by providing a save area in the HDD 108 and moving the print job to the save area, by setting a flag for indicating that the print job is now saved, or by moving the print job to the end of the print queue. Whichever method is used, the processing should ensure that printing does not start until confirmation of all of the jobs in the print queue has finished.

On the other hand, if it is determined in step S308 that confirmation is finished for all of the jobs in the print queue (YES in step S308), the processing proceeds to step S310. In step S310, an instruction to replace (set) the roll paper is displayed on the operation panel 106. At this stage, the size (width) and the kind of paper of the roll paper to be used are simultaneously displayed. Then, in step S311, if it is determined that replacement of the roll paper is completed (YES in step S311), the processing proceeds to step S302. In step S302, printing of the print job for which replacement of the roll paper was necessary is executed. In this example, it is assumed that there are no other jobs other than the job for which replacement of the roll paper is necessary, and if the target job is saved in step S309, printing is executed after setting the print job as the print target. Further, if the target job is not saved in step S309, printing of the print job is executed as is. Further, although the above example is described with the processing remaining on standby until the roll paper is replaced, the present invention is not limited to this configuration. The processing may return to a standby state and proceed to step S301 if replacement is not performed even after a predetermined period has elapsed based on a time measurement by the timer 104.

If it is determined in step S307 that the target job is not a job requiring replacement of the roll paper (NO in step S307), the processing proceeds to step S312. In step S312, it is determined whether the width and the kind of the roll paper to be used for the job identified by the target job analysis match those of the roll paper used in the printing in step S302. If it is determined that the width and the kind of the roll paper to be used for the job do not match those of the roll paper used in the printing, this means that the roll paper needs to be switched (YES in step S312) and the processing proceeds to step S313. If it is determined that the width and the kind of the roll paper to be used for the job match those of the roll paper used in the printing, this means that the roll paper does not need to be switched (NO in step S312), and the processing proceeds to step S302. In step S302, the printing of the job is executed without switching the roll paper.

Although whether the width of the roll paper to be used matches is included as a condition for determining whether roll paper switching is necessary, this indicates that only the width is determined for the paper size. More specifically, for a continuous paper sheet like the roll paper, since an A4 size job and an A3 size job are jobs both included in the A3 width (A3 short side), printing can be performed using the same roll paper. Therefore, an A3 print job and an A4 print job can be sequentially printed. Such printing processing can be realized by varying a cutting position of the roll paper for the A3 print job and the A4 print job. When printing is executed on the roll paper having an A3 width and the target job is an A4 print job, the CPU 101 executes printing by rotating the image by 90 degrees, and cuts the roll paper at the A4 short side position. For an A3 print job, printing is executed without rotating the image and the roll paper is cut at the A3 long side position. This example is for when the print data is input in the longitudinal direction. When the print data is input in a widthwise direction, the image is not rotated for an A4 print job, but is rotated for an A3 print job.

In step S313, the CPU 101 determines whether the confirmation following step S307 is performed for all of the jobs in the print queue stored in the HDD 108. If it is determined that confirmation has finished (YES in step S313), this means that the only job to be printed is the present job which requires roll paper switching, so the processing proceeds to step S314. In step S314, the roll paper is switched as illustrated in FIG. 2. Then, the processing proceeds to step S302, and the printing of the job is executed on another roll of the roll paper having at least a different width or paper kind.

On the other hand, if it is determined in step S313 that there is a job which is not yet confirmed (NO in step S313), the processing proceeds to step S315. In step S315, a standby flag is set for the target print job. The standby flag is to make sure that a job requiring roll paper switching is not executed despite the presence of a print job which can be executed without roll paper switching. Other than setting a standby flag, various other methods may be employed, as long as such method keeps the job from starting.

Then, the processing following step S306 is repeated. If it is determined in step S313 that all of the jobs have been confirmed (YES in step S313), the processing proceeds to step S314. In step S314, the roll paper is switched. If the standby flag has been set, printing is executed after resetting the flag. If the standby flag has not been set, printing is executed as is.

Based on the above processing, a print job order can be determined so that a plurality of print jobs to be executed by the printing control apparatus 100 can be efficiently executed by reducing the frequency of the roll paper switching and the roll paper replacement. Further, the above processing serves as the basic operation of the printing control apparatus 100.

Figure 4:
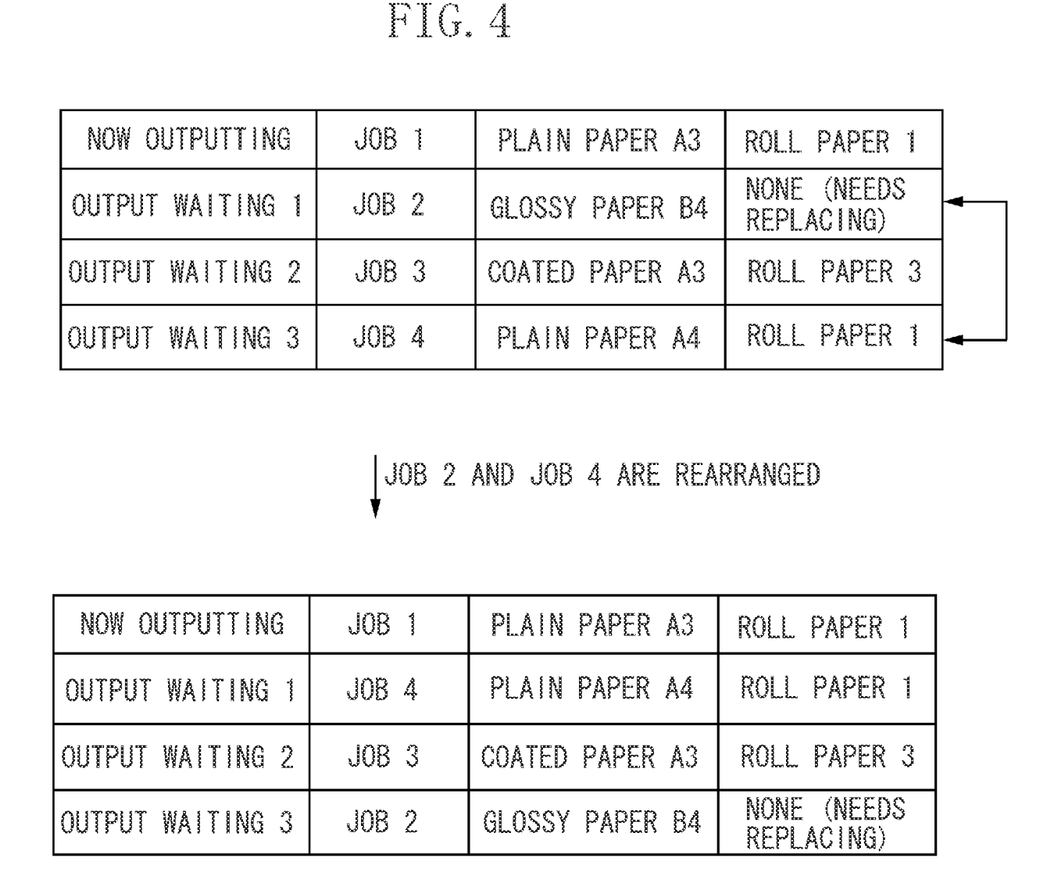
FIG. 4 illustrates an example of job rearrangement.

FIG. 4 illustrates an example in which the job order is rearranged. In FIG. 4, an example is illustrated in which a job 1 is the job being output (print processing is being executed), and print jobs were subsequently input in the order of jobs 2, 3, and 4. In the printing control apparatus 100, currently, roll paper 1 having an A3 width and a plain paper kind, and roll paper 3 having an A3 width and a coated paper kind are set. Roll paper having a B5 width and a glossy paper kind is not set. If the print jobs are executed based on the input order, after the job 1 is finished, since B4 size glossy paper is not currently set in the printing control apparatus 100, the processing either waits for such paper to be set, or executes the printing of the job 3 by switching the paper feeding storage unit to the roll paper 3. After the job 3 is executed, the job 4 is executed by again switching the paper feeding storage unit to the roll paper 1.

On the other hand, if the job order is determined as illustrated in FIG. 3, the jobs 2 and 4 are switched. In this case, after the job 1 is executed, the job 4 is executed without switching the paper feeding storage unit. Then, the job 3 is executed by switching the paper feeding storage unit to the roll paper 3. Next, a message prompting B5 width (or B4 width) glossy paper roll paper to be set is displayed on the operation panel 106. When such roll paper is set, the job 2 is printed on the roll paper. Consequently, unnecessary roll paper switching and roll paper replacement waiting can be reduced and, from an overall perspective, the print processing of the print jobs can be finished earlier than when the print jobs are executed in the input order.

In the above described example, the existence of roll paper replacement and roll paper switching are considered. However, the effects of the present invention can be obtained by just considering either one of these. Further, although both the width (size) and kind of the roll paper to be used are used as the condition for rearranging the jobs, if it is apparent that only one kind of paper will be used, just the width (size) may be used as the condition. Conversely, if it is apparent that only a recording medium having a specific size will be used, just the sheet kind (plain paper, glossy paper, film, cloth etc.) may be used as the condition. Further, information other than the size or sheet kind may be used as the sheet type. The condition for determining the roll paper to be used is not limited to the width and paper kind. Other conditions may be also be used.

As described above, when the job execution order is changed based on the information about the width and paper kind corresponding to the input print job, a situation may arise in which a specific print job is not executed for a long period of time. Such a situation can be resolved by enabling a condition to be set which indicates how much postponement (overtaking) of job execution to permit.

More specifically, the user may preset whether to permit execution of a job to be postponed from the operation panel 106. If the user permits postponement, the user then specifies the number of jobs permitted for overtaking, time, number of pages, roll paper conveyance distance, and the like as permission limit information. The permission limit information is stored in the RAM 102 or the like. More specifically, a case in which the print job is executed in the input order is stored as a zero, and the number of jobs which may overtake, time, number of pages, and roll paper conveyance distance are stored. Further, instead of storing the permission limit information in the RAM 102, whether overtaking is permitted may be determined for each job by setting the permission limit information in the print job from the host computer, and then sending the print job to the printing control apparatus 100.

Further, the permission limit information may be any one of the number of jobs, time, number of pages, and roll paper conveyance distance. Based on the permission limit information, before determining in step S314 whether to switch the roll paper, the execution order for all of the jobs is determined. More specifically, when the job execution order is determined, the print processing is executed so that the job to be postponed does not exceed the permission limit information. Further, rather than being specified by the user, the permission limit information may be set in the printing control apparatus 100 as a fixed value.

Figure 5:
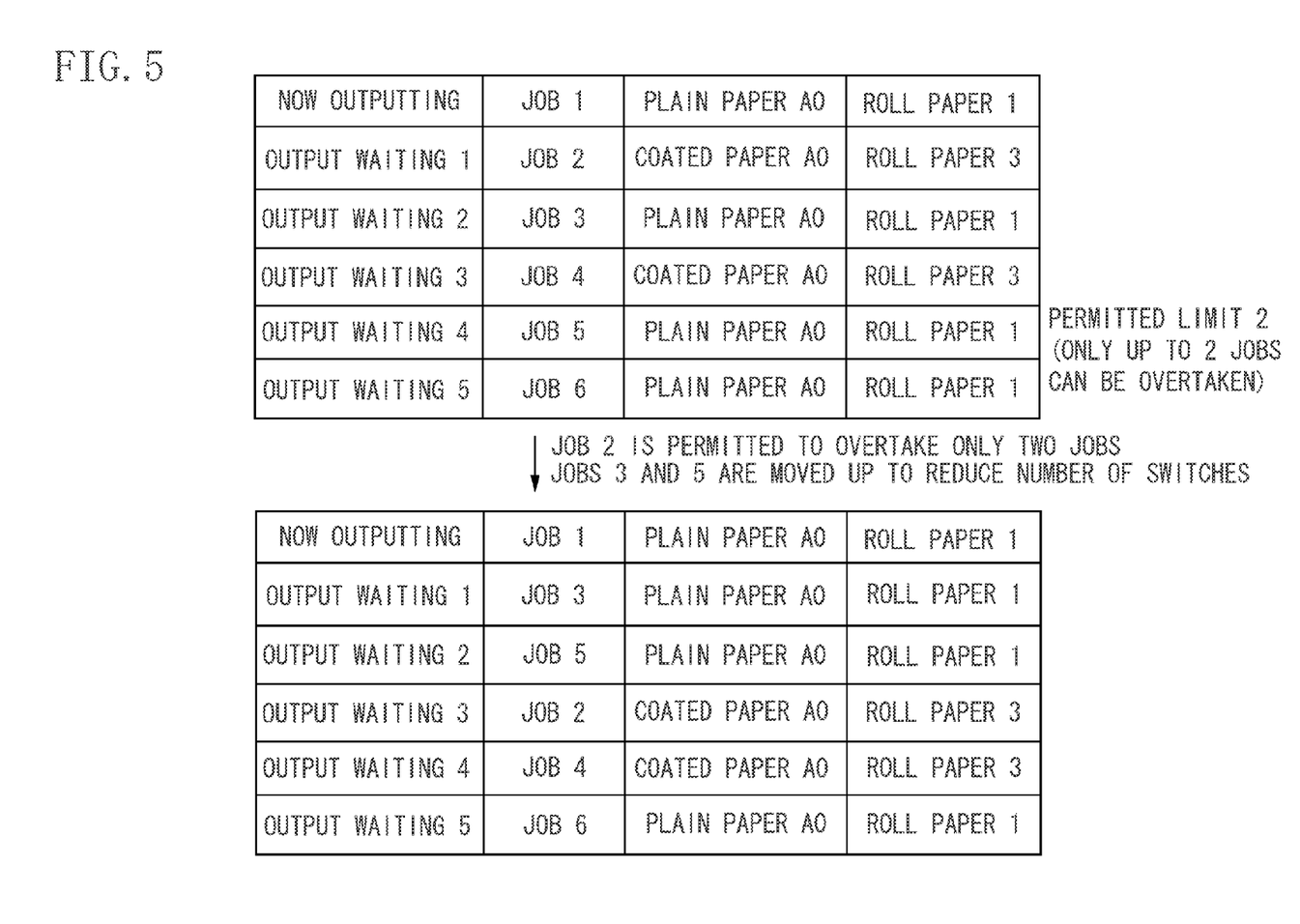
FIG. 5 illustrates an example of job rearrangement.

Such a case will now be described using FIG. 5. For ease of description, in this example, "2" jobs only is specified as the permission limit information. Further, a job 1 is now being output, and jobs 2, 3, 4, and 5 were subsequently input in that order. If the print job execution order is determined without considering the permission limit information, the order will be the jobs 3, 5, 6, 2, and 4. However, in this case the job 2 will be overtaken by 3 jobs, which exceeds the permitted limit. Therefore, considering the permission limit information, the CPU 101 rearranges the order so that the print jobs are executed in order of the jobs 3, 5, 2, 4, and 6. Consequently, the print processing can be executed in such a manner that a specific print job is not overtaken by a large number of jobs, while preventing as much unnecessary switching of the storage units as possible. This is the same when permission limit is performed using information other than the number of jobs.

In the above description, although all jobs in the print queue are analyzed, and the job execution order among all of those jobs is determined, the present invention is not limited to this. More specifically, of the jobs in the print queue, the processing of FIG. 3 may be applied on a predetermined number of jobs or less. The predetermined number may be specified from the operation panel 106 and stored in the RAM 102. In this case, in the flowchart illustrated in FIG. 3, the jobs to be confirmed in step S308 and S313 may be changed from "all" to "3 jobs" registered in the RAM 102.

In this case too, when jobs are rearranged, the considered condition is not limited to the number of jobs. Similar to the above, the considered condition may be the time, number of pages, roll paper conveyance distance, and the like. Whichever condition is used, a job which is included in a predetermined range becomes an execution order determination target among the jobs in the print queue, like that described above. Further, rather than being specified by the user, the number of jobs set as the print execution order determination target may be set in the printing control apparatus 100 as a fixed value.

Figure 6:
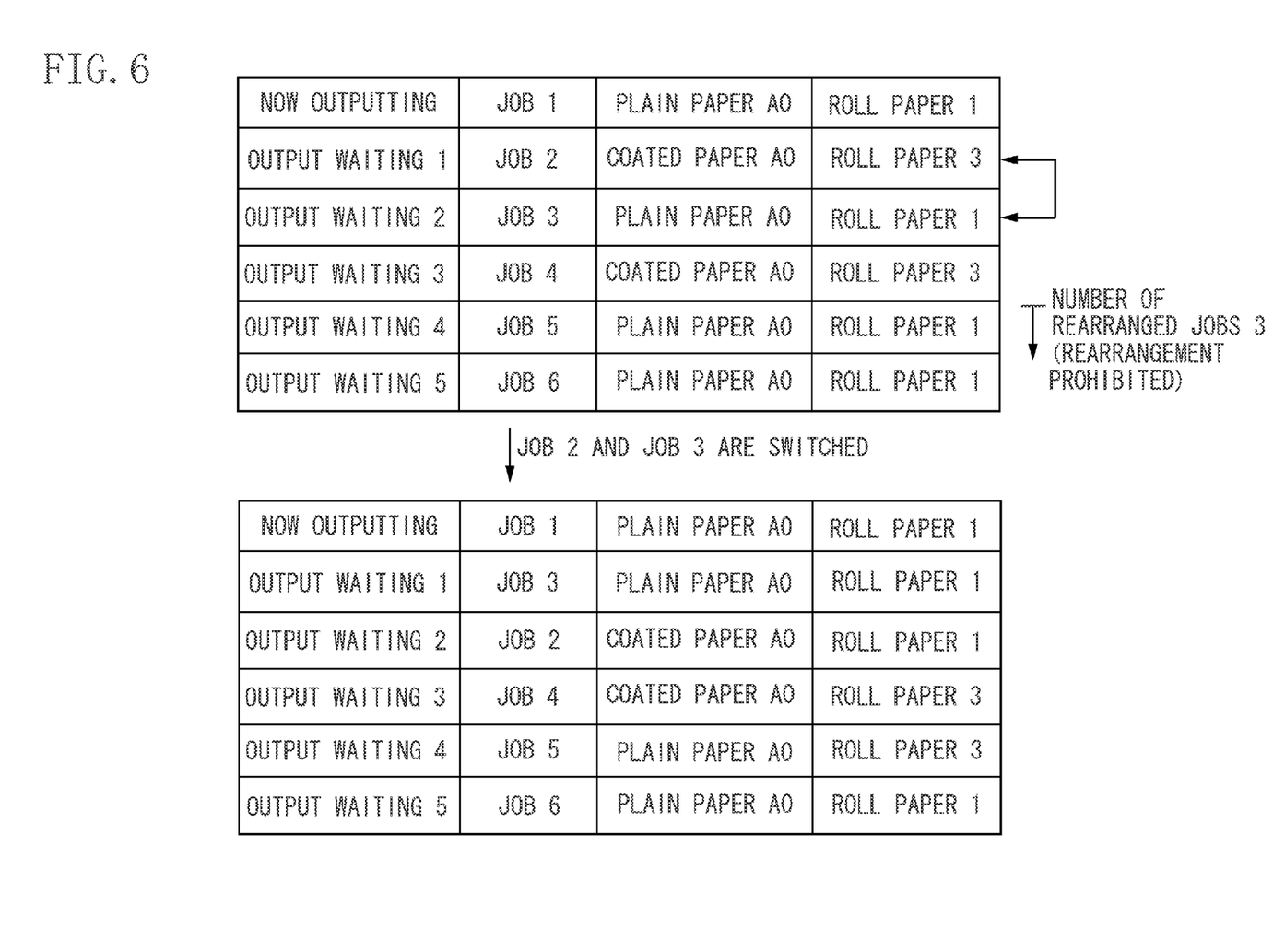
FIG. 6 illustrates an example of job rearrangement.

Such a case will now be described using FIG. 6. For ease of description, in this example, print processing which considers job rearrangement is limited by the number of jobs. If the print job execution order is determined by considering all of the jobs in the print queue, the order will be the jobs 3, 5, 6, 2, and 4. However, if the considered number of jobs is "3", the order becomes the jobs 3, 2, 4, 5, and 6. Consequently, the job execution order can be determined without waiting for all of the jobs to be analyzed, which allows the jobs to be executed rapidly. This is the same when considering information other than the number of jobs.

Further, the print job execution order may be determined by appropriately combining the above described examples.

Thus, according to the present exemplary embodiment, when the execution order of a plurality of input print jobs is determined, the size of the paper (sheet) to be used is identified for each print job, and the print processing is controlled so that print jobs having a common width are consecutively executed based on the size. At this stage, the printing is continued if the lengths in the conveyance direction of the roll paper do not match. Consequently, according to the present exemplary embodiment, while matching the print job execution order and the print job input order as much as possible, the number of times that the storage unit for feeding the roll paper of the print target is switched can be reduced, and an efficient print job execution order can be achieved. Further, by considering a condition other than the paper size, the print job execution order can be determined over an even wider application range.

Further, according to the present exemplary embodiment, when the printing order is changed, since a condition permitting overtaking by other print jobs is set, and overtaking within that condition is permitted, a situation in which printing of an input print job is indefinitely delayed can be prevented.

Further, the number of print jobs set as the print execution order determination target is also within a specific condition. Therefore, an earlier-input print job is not postponed more than necessary. Moreover, the situation in which the printing of a print job in the print queue is not started for a long period because of waiting determination of the printing order can be prevented. In addition, since the number of jobs referred to in order to determine the printing order does not become too large, the processing for determination is not complex.

The above processing can be performed by the any of the host computers 151 to 153 acquiring status information, such as a print job queuing status, from the printing control apparatus 100. In such a case, using the CPU, HDD, and RAM of the host computer, a program is read from the HDD for performing the processing illustrated in FIGS. 3 to 6, and the program is loaded and executed in the RAM. The host computer in this case serves as the printing control apparatus for executing printing on the printing control apparatus 100.

As described above, the object of the present invention may also be achieved by supplying a storage medium on which a software program code for realizing the functions of the above exemplary embodiment is stored to a system or an apparatus, and having a computer (or a CPU or a micro processing unit (MPU)) of the system or apparatus read and execute the stored program code. In this case, the program code itself read from the storage medium realizes the novel functions of the present invention, so that the storage medium on which the program code is stored constitutes another embodiment according to the present invention. Therefore, as long as it has the function of a program, a form of the program is not limited, and may be an object code, a program executed by an interpreter, script data supplied to an operating system (OS) and the like.

The program executed by the printing control apparatus 100 or the host computers 151 to 153 may be executed by one CPU or by a plurality of CPUs linked together. Further, the processing may be executed by appropriately combining software and hardware. In addition, instead of executing the program by the CPU in the printing control apparatus, the program may be executed by a CPU in an apparatus provided externally to the printing control apparatus.

Further, a part of all of the processing executed by the program may be replaced with hardware (e.g., an electric circuit).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-143528 filed Jun. 16, 2009, which is hereby incorporated by reference herein in its entirety.

What is claimed is:

1. A printing control apparatus for printing an image on a continuous sheet, the printing control apparatus comprising:
   an input unit configured to input a print job;
   a determination unit configured to determine whether at least one of a size in a length direction and a size in a width direction of a sheet to be used for a target print job matches a width of the continuous sheet being used in printing;

a decision unit configured to decide an execution order of a plurality of print jobs based on a determination result, and a print control unit configured to cause a print unit to print images based on the plurality of print jobs on the continuous sheet, based on the execution order decided by the decision unit, wherein the decision unit decides, if one of the size in the length direction and the size in the width direction of the sheet to be used for the target print job matches the width of the continuous sheet being used in the printing and the other one of the sizes does not match the width of the continuous sheet being used in the printing, the execution order so that the target print job gets ahead of a print job for which both of the size in the length direction and the size in the width direction of the sheet do not match the width of the continuous sheet being used in the printing, and a plurality of print jobs for which at least one of the size in the length direction and the size in the width direction matches the width of the continuous sheet being used in the printing are consecutively printed on the continuous sheet, and wherein the print control unit causes the print unit to print by rotating an image based on the target print job if a size in a direction of the sheet to be used for the target job, along the width of the continuous sheet being used in the printing does not match the width of the continuous sheet being used in the printing.

2. The printing control apparatus according to claim 1, wherein the decision unit decides the execution order of the plurality of print jobs so that a print job using the continuous sheet being used in printing is earlier executed.

3. The printing control apparatus according to claim 1, wherein the decision unit decides the execution order which is different from the input order of print jobs input by input unit.

4. The printing control apparatus according to claim 1, further comprising a setting unit configured to set a condition for specifying how much postponement of job execution is permitted; and wherein the decision unit decides an execution order in a range in which the print job input by the input unit is not postponed by more than the condition set by the setting unit.

5. The printing control apparatus according to claim 4, wherein the postponed print job is not subject to the consecutively executed printing on the same continuous sheet fed from the same storage unit.

6. The printing control apparatus according to claim 4, wherein the condition includes any of the number of jobs to be overtaken, time, the number of pages, and a conveyance distance of the recording medium.

7. The printing control apparatus according to claim 4, wherein a print job which is able to the consecutively executed printing on a continuous sheet fed from a first storage unit is executed on the continuous sheet fed from the first storage unit while the postponed print job is postponed, wherein the postponed print job uses a continuous sheet fed from a second storage unit which is different from the first storage unit.

8. The printing control apparatus according to claim 4, wherein the postponed print job includes a print job using a continuous sheet which is not set in the plurality of storage units.

9. The printing control apparatus according to claim 1, wherein the decision unit is configured to decide the execution order of the print job included in a predetermined range in the plurality of print jobs.

10. The printing control apparatus according to claim 9, wherein the predetermined range includes a number of print jobs in a print queue.

11. The printing control apparatus according to claim 1, further comprising the print unit.

12. A method for controlling a printing control apparatus for printing an image on a continuous sheet, the method comprising:

inputting a plurality of print jobs;

determining whether at least one of a size in a length direction and a size in a width direction of a sheet to be used for a target print job matches a width of the continuous sheet being used in printing;

deciding an execution order of the plurality of print jobs based on a determination result; and printing images based on the plurality of print jobs on the continuous sheet, based on the decided execution order, wherein the execution order is decided, if one of the size in the length direction and the size in the width direction of the sheet to be used for the target print job matches the width of the continuous sheet being used in the printing and the other one of the sizes does not match the width of the continuous sheet being used in the printing, the execution order so that the target print job gets ahead of a print job for which both of the size in the length direction and the size in the width direction of the sheet do not match the width of the continuous sheet being used in the printing, and a plurality of print jobs for which at least one of the size in the length direction and the size in the width direction matches the width of the continuous sheet being used in the printing are consecutively printed on the continuous sheet and wherein the printing is consecutively executed by rotating an image based on the target print job if a size in a direction of the sheet to be used for the target print job, along the width of the continuous sheet being used in the printing does not matches the width of the continuous sheet being used in the printing.

13. A non-transitory computer-readable storage medium storing a computer-executable program for executing a method for controlling a printing control apparatus for printing an image on a continuous sheet, the program comprising processing for:

inputting a plurality of print jobs;

determining whether at least one of a size in a length direction and a size in a width direction of a sheet to be used for a target print job matches a width of the continuous sheet being used in printing;

deciding an execution order of the plurality of print jobs based on the determination result; and printing images based on the plurality of print jobs on the continuous sheet, based on the decided execution order, wherein the execution order is decided, if one of the size in the length direction and the size in the width direction of the sheet to be used for the target print job matches the width of the continuous sheet being used in the printing and the other one of the sizes does not match the width of the continuous sheet used in the printing, the execution order so that the target print job gets ahead of a print job for which both of the size in the length direction and the size in the width direction of the sheet do not match the width of the continuous sheet being used in the printing, and a plurality of print jobs for which at least one of the size in the length direction and the size in the width direction matches the width of the continuous sheet in the printing are consecutively printed on the continuous sheet and wherein the printing is consecutively executed by rotating an image based on the target print job if a size in a direction of the sheet to be used for the target print job, along the width of the continuous sheet being used in the printing does not match the width of the continuous sheet being used in the printing.

* * * * *